W. ST. J. BRICE.
BRICK MOLDING MACHINERY.
APPLICATION FILED MAY 20, 1911.
1,027,315.
Patented May 21, 1912.
2 SHEETS—SHEET 1.
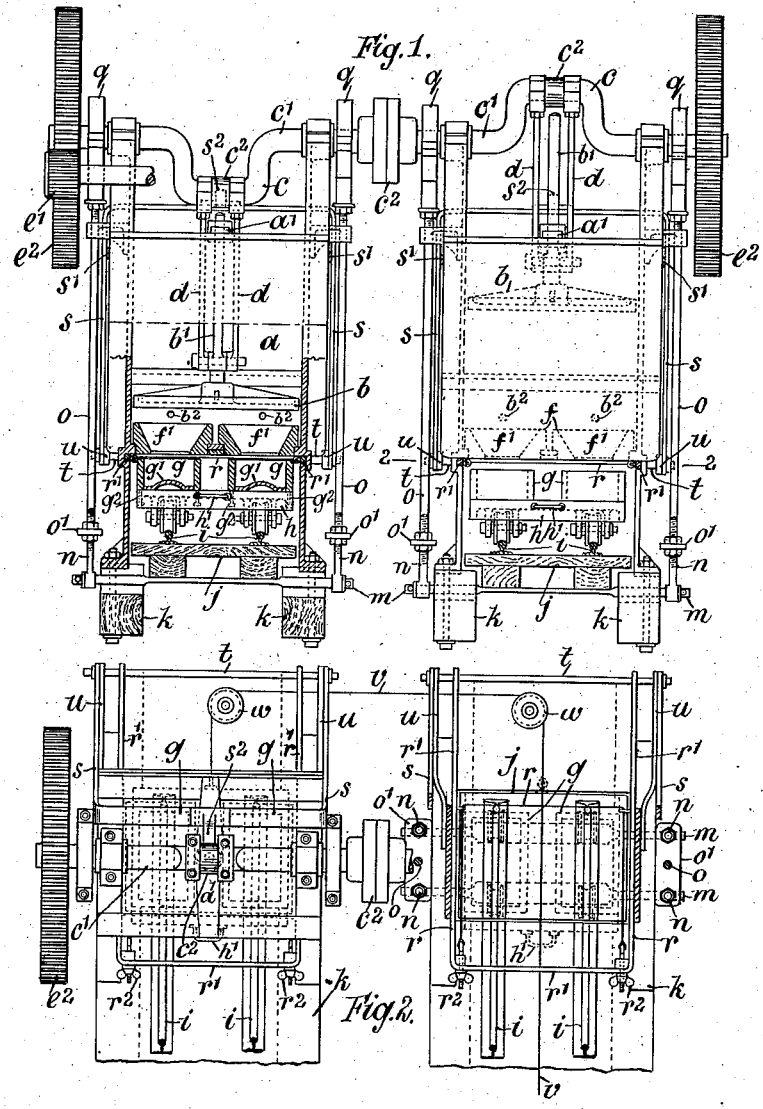
WITNESSES:
John C. Sanders
Leon Spring
INVENTOR:
Walter St. John Brice,
BY
ATTY.

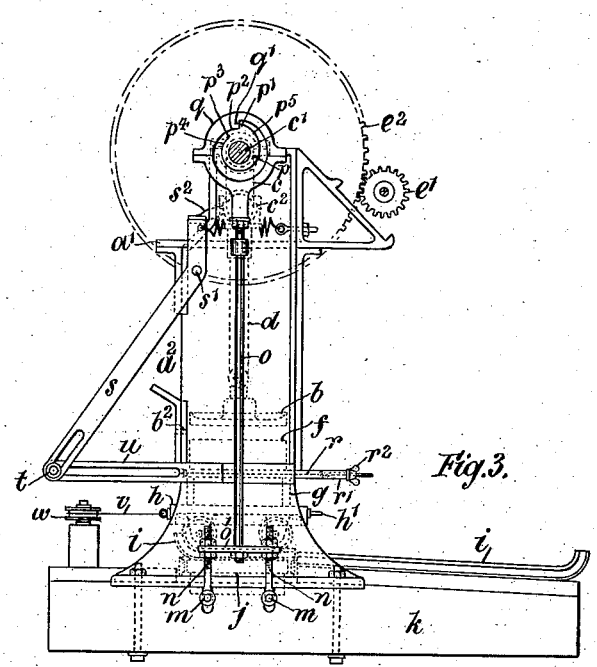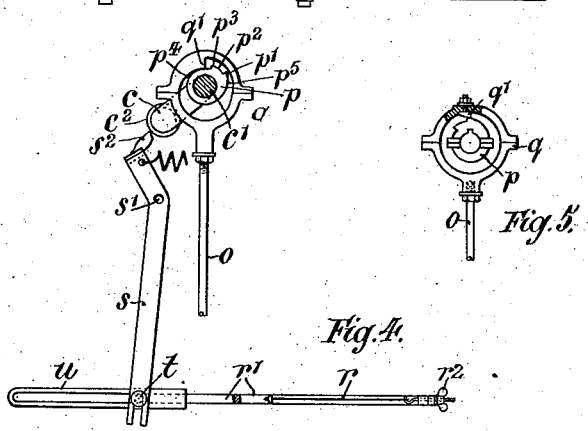

UNITED STATES PATENT OFFICE.

WALTER ST. JOHN BRICE, OF ROCHESTER, ENGLAND.

BRICK-MOLDING MACHINERY.

1,027,315.  Specification of Letters Patent.  Patented May 21, 1912.

Application filed May 20, 1911. Serial No. 628,424.

*To all whom it may concern:*

Be it known that I, WALTER ST. JOHN BRICE, subject of the King of Great Britain, residing at 6 High street, Rochester, in the county of Kent, England, have invented new and useful Improvements in Brick-Molding Machinery, of which the following is a specification.

This invention relates to brick molding machinery, and consists in improved mechanism for automatically effecting the lifting and lowering of the mold-platform at timed intervals relatively to the position of the plunger, and in improved mechanism for automatically operating the cutter during the period between the two stages of lowering the mold.

Moreover, a wheeled mold-carrying carriage being employed, the present invention also consists in so interconnecting the wheeled mold-carrying carriages of a pair of machines that when the carriage of the one machine is withdrawn by a handle, pedal or other means, the carriage of the other automatically returns to beneath its die and press.

The automatically lifting and two-stage lowering of the platform is effected by suspending the same from straps which embrace stepped cams, after the manner of an eccentric strap, which cams are secured to a crank-shaft, the crank of which actuates the plunger. The crank during its upstroke also serves as a cam to rock a lever whereby the cutter is actuated.

A pair of interconnected machines embodying the above improvements is illustrated on the accompanying drawings, in connection with which certain details which are included in the present invention will be described.

In these drawings:—Figure 1 is a front elevation of two interconnected brick-molding machines, parts of which are shown in section, and Fig. 2 is a corresponding plan, the right-hand machine being in section taken along the line 2—2 of Fig. 1. Fig. 3 is a side elevation, and Fig. 4 shows a detail, and Fig. 5 shows a modification thereof.

$a$ is the chamber of a press, within which a plunger $b$ is reciprocated by means of a crank $c$ and pitman $d$, pin-jointed to the rod $b^1$ of the plunger $b$. The plunger rod $b^1$ is guided in an aperture provided in a bar $a^1$ which extends across the chamber $a$ from the front to the rear thereof. The crank-shaft $c^1$ is driven by means of a pinion $e^1$ which gears with a spur-wheel $e^2$ secured to the crank-shaft, and the crank-shafts of the two machines are connected by a coupling $c^2$ with their cranks 180° apart.

Clay prepared for brick making is introduced into the press-chamber $a$ beneath the plunger $b$, through a feed-opening $a^2$, and is expressed by the plunger $b$, on its descent, through the hopper-shaped apertures $f^1$ of two dies $f$ which constitute the bottom of the press, into a pair of molds $g$ beneath. As usual, the areas of the lower ends of the apertures $f^1$ are less than the areas of the cavities of the molds, in order that the clay in being forced into the molds shall not displace the sand with which the surfaces of the cavities are covered for the purpose of preventing adhesion of the clay thereto.

The molds $g$ rest upon a wheeled carriage $h$, the wheels of which run on rails $i$ mounted on a platform $j$ and on the wooden base $k$ of the machine. As may be seen in Fig. 3, the ends of the rails are curved upward to limit the travel of the carriage $h$, and at the right-hand edge of the platform $j$, as viewed in Fig. 3, the rails are divided to permit of the platform $j$ being raised and lowered.

The platform and carriage are raised to bring the molds $g$ close up beneath the apertures $f^1$ of the dies $f$, by the platform being suspended by two transverse bars $m$ arranged beneath same, the ends of the bars $m$ being supported each in the eyes of bolts $n$, of which there are consequently two on each side of the machine. The eye-bolts $n$ on each side of the machine are in turn suspended from a cross-head $o^1$ secured to the end of a rod $o$, the upper end of which is secured to a strap $q$ which embraces a stepped cam $p$ secured on the crank-shaft $c$. The beams of the base $k$ are suitably notched to permit the vertical movement of the transverse bars $m$.

The cams $p$ on each side of the machine are stepped alike and work in unison to raise and lower the platform $j$. There are two steps $p^1$ and $p^3$ on each cam, between which is a portion $p^2$ concentric with the crank-shaft. The cams are so keyed on the shaft that the step $p^1$ is angularly opposite to the crank, consequently the step $p^1$ comes out of engagement with a tooth $q^1$ of the strap $q$, when the crank is in its lowest position and the plunger is at the bottom of its stroke. The platform, carriage and the molds are thereby dropped through the first stage of their descent, the subsequent stage occurring when, on further rotation of the crank-shaft, the second step $p^3$ permits the tooth $q^1$ to fall still farther.

In the interval between the two stages of the descent of the molds which occurs while the tooth $q^1$ of the strap $q$ is resting on the concentric portion $p^2$ of the cam, a cutter wire $r$ is moved across the lower surfaces of the dies $f$ and upper surfaces of the molds $g$. This is effected by a U-shaped cutter-frame $r^1$ in which the wire $r$ is mounted, being displaced in guide grooves formed in the frame of the machine by means of a built-up lever $s$, fulcrumed at $s^1$, which is angularly displaced by a roller $c^2$, mounted on the crank $c$ between the pitmen $d$, coming into contact with a finger $s^2$ mounted between the two bars which constitute the built-up lever $s$. The lower ends of the two bars forming the lever $s$, are slotted to receive the ends of a transverse rod $t$ to which the ends of the U-shaped cutter-frame $r^1$ are secured. The lever $s$ is returned by a spring $x$. The ends of the transverse rod $t$ are guided in slotways in brackets $u$.

The platform, carriage and molds are gradually raised by portions $p^5$ of gradually increasing radius, of the cams $p$, bearing beneath the inclined surfaces of the teeth $q^1$. Prior to being raised, the platform $j$ will remain for a period approximately equal to the period of half a revolution of the crank-shaft, at its lowest position, by virtue of the teeth $q^1$ bearing on portions $p^4$ of the smallest radius of the cams. During this period, the carriage $h$ is withdrawn from beneath the dies by means of a handle $h^1$ and the filled molds removed and replaced by empty sanded ones.

With a pair of machines as shown, the withdrawal of the carriage of one effects the automatic return of the carriage of the other machine, by the carriages being interconnected by a cable $v$ which is led over guide-sheaves $w$ rotatably mounted on studs secured to the bases of the two machines, as shown in Fig. 2.

The tension of the cutter wire $r$ in the cutter frame can be adjusted by nuts $r^2$.

The molds $g$ are closed at their bottoms by stock-plates $q^1$ having convex frogs as usual resting on the carriage, and to allow for the different shrinkages of different clays, the molds are vertically adjustable in the known manner by means of screws $g^2$.

The under surface of the plunger $b$ is, in the usual manner, so prepared or is of such configuration as to prevent the adherence of clay thereto, and to permit of the escape of excess clay from the chamber $a$, relief holes $b^2$ are provided in the walls thereof.

The teeth $q^1$ of the straps $q$ and the cams $p$ are the parts of the machines which are most exposed to wear, and for this reason they are preferably constructed in separable portions facilitating renewal by unskilled labor, as shown in Fig. 5.

I claim,

1. In a brick-molding machine, a press-chamber, a die beneath said chamber, a plunger in said chamber, a shaft journaled above said chamber, a crank on said shaft connected with said plunger, a cam on said shaft having a step angularly opposite to said crank a portion of intermediate radius a second step and a portion of increasing radius, a toothed strap embracing said cam, a mold-platform beneath said die and means suspending said platform from said strap.

2. In a brick-molding machine, a press-chamber, a die beneath said chamber, a plunger in said chamber, a shaft journaled above said chamber, a crank on said shaft connected with said plunger, a cam on said shaft at opposite sides of said chamber having a step angularly opposite to said crank a portion of intermediate radius a second step and a portion of increasing radius, a toothed strap embracing each said cam, a mold-platform beneath said die and means suspending said platform from said straps.

3. In a brick-molding machine, a press-chamber, a die beneath said chamber, a plunger in said chamber, a shaft journaled above said chamber, a crank on said shaft connected with said plunger, a cam on said shaft at opposite sides of said chamber having a step angularly opposite to said crank a portion of intermediate radius a second step and a portion of increasing radius, a toothed strap embracing each said cam, a rod depending from each said strap and a mold-platform beneath said die connected to said rods.

4. In a brick-molding machine, a press-chamber, a die beneath said chamber, a plunger in said chamber, a shaft journaled above said chamber, a crank on said shaft connected with said plunger, a lever pivoted adjacent to said chamber with one end in the ascending portion of the path of said crank, a spring connected to said lever, a cutter-frame horizontally displaceable beneath said die and connected to the other end of said lever, a cam on said shaft at opposite sides of said chamber having a step angularly opposite to said crank a portion of intermediate radius a second step and a portion of increasing radius, a toothed strap embracing each said cam, a rod depending from each said strap and a mold-platform beneath said die connected to said rods.

5. In a pair of interconnected brick-molding machines, a press-chamber of each machine, a die beneath each said chamber, a plunger in each said chamber, a shaft journaled above each said chamber, a crank on each said shaft connected with each said plunger, a coupling connecting said shafts with said cranks 180° apart, a cam on each said shaft at opposite sides of each said chamber having a step angularly opposite to the said crank of said shaft a portion of intermediate radius a second step and a portion of increasing radius, a toothed strap embracing each said cam, a rod depending from each strap, a mold-platform beneath each said die connected to said rods, rails on each said mold-platform, a wheeled mold-carriage running on said rails on each said platform, a guide-sheave behind each carriage and a cable led around said sheaves and connected at each end to one of said carriages.

6. In a pair of interconnected brick-molding machines, a press-chamber of each machine, a die beneath each said chamber, a plunger in each said chamber, a shaft journaled above each chamber, a crank on each said shaft connected with each said plunger, a lever pivoted adjacent to each said chamber with one end in the ascending portion of the path of one of said cranks, a spring connected to each said lever, a cutter-frame horizontally displaceable beneath each said die and connected to the other end of one of said levers, a coupling connecting said shafts with said cranes 180° apart, a cam on each said shaft at opposite sides of each said chamber having a step angularly opposite to the said crank of said shaft a portion of intermediate radius a second step and a portion of increasing radius, a toothed strap embracing each said cam, a rod depending from each said strap, a mold-platform beneath each said die connected to said rods, rails on each said mold-platform, a wheeled mold-carriage running on said rails on each said platform, a guide-sheave behind each said carriage and a cable led around said sheaves and connected at each end to one of said carriages.

In testimony whereof I have signed my name to this specification in the presence of two subscribing witnesses.

WALTER ST. JOHN BRICE.

Witnesses:
RIPLEY WILSON,
C. P. LIDDON.

Copies of this patent may be obtained for five cents each, by addressing the "Commissioner of Patents, Washington, D. C."